United States Patent
Günther et al.

(10) Patent No.: US 8,246,342 B2
(45) Date of Patent: Aug. 21, 2012

(54) INJECTION MOULDING DEVICE

(75) Inventors: Herbert Günther, Allendorf (DE);
Siegrid Sommer, Burgwald (DE);
Torsten Schnell, Lichtenfels (DE)

(73) Assignee: GUNTHER Heisskanaltechnik, Frankenberg (DE)

( * ) Notice: Subject to any disclaimer, the term of this patent is extended or adjusted under 35 U.S.C. 154(b) by 0 days.

(21) Appl. No.: 12/742,279

(22) PCT Filed: Nov. 12, 2008

(86) PCT No.: PCT/EP2008/009516
§ 371 (c)(1),
(2), (4) Date: May 11, 2010

(87) PCT Pub. No.: WO2009/062669
PCT Pub. Date: May 22, 2009

(65) Prior Publication Data
US 2010/0255145 A1    Oct. 7, 2010

(30) Foreign Application Priority Data
Nov. 12, 2007  (DE) .................... 20 2007 015 873 U

(51) Int. Cl.
*B29C 45/22* (2006.01)
(52) U.S. Cl. .................................... 425/572; 264/328.8

(58) Field of Classification Search .................. 425/572;
264/328.8
See application file for complete search history.

(56) References Cited

U.S. PATENT DOCUMENTS

| | | | |
|---|---|---|---|
| 4,344,750 A | 8/1982 | Gellert | |
| 4,981,431 A * | 1/1991 | Schmidt | 425/549 |
| 5,326,251 A | 7/1994 | Gellert | |
| 5,736,171 A | 4/1998 | McGrevy | |
| 7,658,606 B2 * | 2/2010 | Klobucar et al. | 425/564 |
| 2003/0082264 A1 | 5/2003 | Babin et al. | |

FOREIGN PATENT DOCUMENTS

| | | |
|---|---|---|
| DE | 34 33 783 A1 | 3/1986 |
| DE | 196 18 960 A1 | 11/1996 |
| DE | 694 12 931 T2 | 1/1999 |
| DE | 100 08 471 A1 | 8/2001 |
| EP | 1 231 041 A1 | 8/2002 |
| WO | 2005/018906 A1 | 3/2005 |

* cited by examiner

*Primary Examiner* — Tim Heitbrink
(74) *Attorney, Agent, or Firm* — Clark & Brody

(57) ABSTRACT

An injection molding nozzle (10) for injection molding equipment and comprising a nozzle casing (14) subtending a longitudinal axis (L) fitted with at least one flow duct (18) for a fluid processing material, further comprising at least one nozzle tip (24) discharging the fluid processing material out of the nozzle casing (14), the minimum of one nozzle tip (24) running transversely to the longitudinal axis (L) of the nozzle casing (14), the minimum of one nozzle tip (24) being integral with the nozzle casing (14).

17 Claims, 3 Drawing Sheets

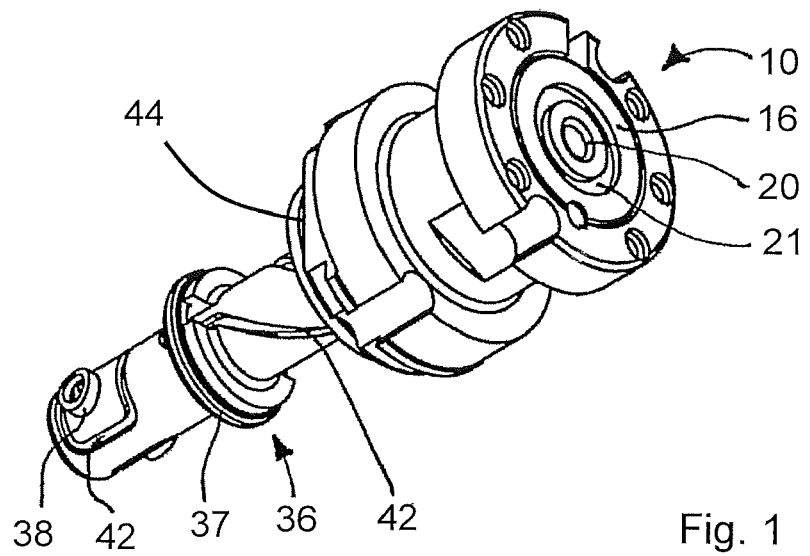
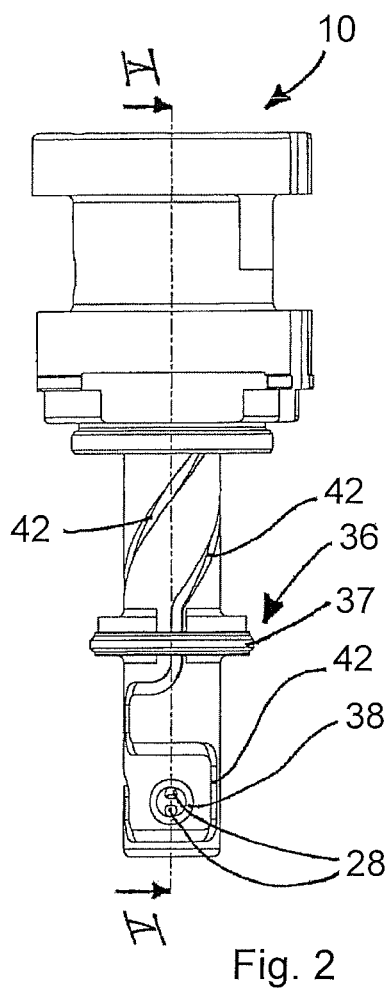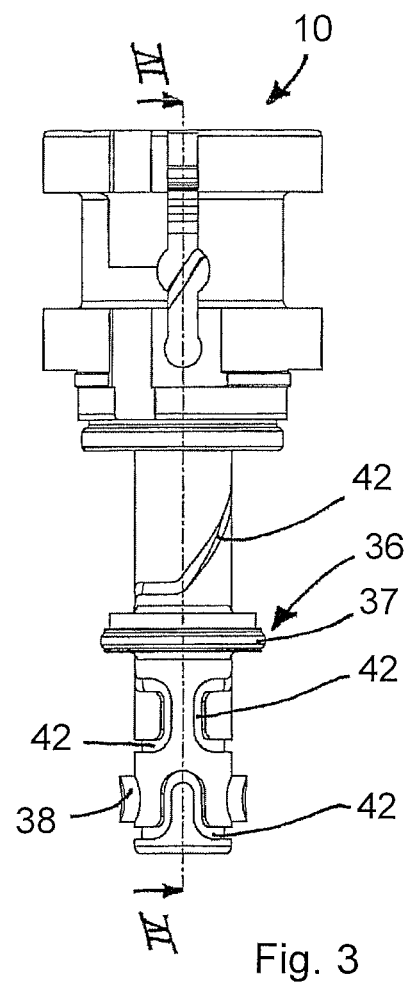
Fig. 2 Fig. 3 though slightly inside the sealing element's contact surface. In that case, any projection from the contact surface constitutes a centering element relative to the mold insert, thereby precluding any lateral offset between the nozzle and said mold insert.

INJECTION MOULDING DEVICE

FIELD OF THE INVENTION

The present invention relates to an injection molding nozzle.

BACKGROUND ART

Such nozzles are used in injection molding equipment to feed a fluid processing material at a predetermined temperature and under high pressure to a separable mold block respectively, to a mold insert. Most such nozzles comprise a tubular casing in the form of a feed pipe fitted with a flow duct for said fluid processing material and with a nozzle tip which is inserted terminally into said pipe and which subtends the discharge aperture of said flow duct.

The state of the art contains the most diverse kinds of injection molding nozzles, in particular those used for edge gating. Most of these nozzles comprise a casing subtending at least one fluid processing material flow duct and at least one nozzle tip running perpendicularly to the longitudinal nozzle casing axis.

Such an injection molding nozzle illustratively is known from the German patent document DE 196 18 960 A1. It comprises several nozzle tips which may be screwed laterally into the externally heated nozzle casing and which, once screwed-in, run radially outward perpendicularly to the nozzle casing's longitudinal axis. The nozzle casing is fitted with a positioning flange segment received in an aperture subtended in the mold insert. The nozzle casing is positioned transversely by means of said segment, and on the other hand it may be advanced longitudinally to allow screwing-in the nozzle tips. Then said casing is moved back into an assembled position wherein it is longitudinally positioned by the nozzle tips received in the mold insert. As a result the nozzle casing is configured longitudinally in the same plane as contains the gates constituted in the mold insert. The nozzle tips and the mold are sealed from each other by seals that are provided at the nozzle tips and at the mold insert and that cooperate radially relatively to the nozzle tips.

One drawback of the injection molding nozzles disclosed in DE 196 18 960 A1 is the relatively high cost of affixing the nozzles—they can be installed into the mold only from below. Accordingly the mold must be disassemblable, entailing not only mold cost but also time delays.

The nozzle tips moreover should be made of a thermally highly conducting substance to assure optimal temperature crossover between the nozzle casing and the nozzle tips to always keep the fluid processing material at an optimal temperature as far as the gate. On the other hand the nozzle tips' sealing faces in contact with the mold should be made of a substance of low thermal conductivity to minimize the heat transfer between the nozzle tips and said mold.

In the design of the injection molding nozzle of DE 196 18 960 A1, the nozzle tips and their sealing faces are integral, namely they are made of one and the same substance. This feature however precludes the herein desired objective of combining optimal injection temperature of the fluid processing material and low heat transfer between said nozzle tip sealing faces and mold. Said known injection molding nozzle incurs a further drawback in that the nozzle casing's flow duct and the nozzle tip boreholes continuing said flow duct as far as the injection site are substantially orthogonal to each other, entailing high flow impedance and commensurately adversely affecting injection molding.

SUMMARY OF THE INVENTION

In the light of the above state of the art, it is the objective of the present invention to create an injection molding nozzle of alternative design at least partly circumventing the above cited drawbacks.

This objective is attained in the present invention by an injection molding nozzle for injection molding equipment, said nozzle being fitted with a nozzle casing having a longitudinal axis and subtending at least one flow duct for a fluid processing material, further at least one nozzle tip discharging the fluid processing material from said casing, the minimum of one nozzle tip running transversely to the nozzle casing's longitudinal axis. In the present invention, the minimum of one nozzle tip is integral (of one piece) with the nozzle casing. The assembling costs of the injection molding nozzle are commensurately reduced.

Preferably a sleeve-like sealing element is configured around each nozzle tip and offers an optimized contact surface which in the design of the invention rests in sealing manner against the wall of a mold insert in order to seal the injection molding nozzle relative to the mold insert. Advantageously the sleeve-like sealing element is made of a thermally poorly conducting substance such as titanium or a ceramic. Accordingly the heat transfer from the injection molding nozzle to the mold insert is minimized and the temperature of the fluid processing material at the time of injection may be adjusted optimally. To attain optimal sealing between the sealing element and the mold insert, the contact surface of the sleeve-like element preferably is processed/machined finely. Such fine processing/machining applies to the contour and the surface roughness of the contact surface, for instance being carried out by grinding or the like.

In one important embodiment mode of the present invention, the contact surfaces of all sealing elements are configured on a cylindrical surface. In this manner the nozzle always can be accurately inserted into a mold plate. Once their operational temperature has been reached, all sealing elements rest in optimally sealing manner against the borehole's inside wall, whereby all nozzle tips are sealed from the mold.

Such a desirable result in particular is attained when designing each sleeve-like sealing element preferably in a manner allowing installing it at low temperature, together with the nozzle casing, into a mold insert, as a result of which it shall rest in sealing manner against the mold insert's associated wall when a predeterminable operational temperature has been reached. This feature allows easily installing the injection molding nozzle of the present invention, the required sealing effect of said element then being attained in the operational state.

In a preferred embodiment mode of the present invention, the contact surface of the sleeve-like sealing element is constituted by an end face of latter, as a result of which its sealing is implemented substantially in the longitudinal direction of the nozzle tip, respectively in the radial direction of the nozzle casing. This feature allows sealing in especially simple manner.

Preferably the nozzle tip is designed not to project beyond the contact surface of the sleeve-like sealing element. Accordingly the injection molding nozzle of the present invention may be used in integral/one-piece molds. Alternatively however the nozzle tip also may be designed in a way to project outward beyond the contact surface of said sleeve-like sealing element. In that case the mold must consist of at least two parts.

Rapid color changes may be advantageously effected when each nozzle tip is fitted with a flow or connection conduit, the flow duct in the nozzle casing being continued by the connection conduits in the nozzle tips in nearly unimpeded manner. As a result the path to the mold intake is devoid of accumulated processing material. When changing colors, the material in the flow duct is rapidly flushed totally out of the duct system, the new color being applicable after only a few injection cycles.

In another embodiment mode of the present invention, the heater and/or the temperature sensors are integrated into the nozzle casing, preferably into corresponding grooves. The heat from the heater passes optimally into the nozzle casing and may propagate uniformly. The temperature sensor detects rapidly and accurately the true particular temperature and transmits its value to a control.

An anti-rotation lock may be advantageously configured between the nozzle casing and the housing. In this manner the nozzle shall always be kept in the same position. Another anti-rotation lock is configured between the housing and the injection molding equipment to prevent the nozzle tips from rotating relative to the gates of said equipment, in particular in the mold nest.

In addition or alternatively, the anti-rotation lock may also be configured between the nozzle casing and the injection molding equipment.

A centering element is configured preferably at the nozzle casing circumference and centers said casing within a mold insert. Said centering element prevents the nozzle casing from moving transversely and as a result it supports the sealing effectiveness of each sleeve-like sealing element.

Advantageously the centering element is made at least in part of a substance of poor thermal conductivity to minimize heat being conducted by it into the mold insert.

Lastly said centering element preferably is fitted with a separate centering ring that may be configured onto a matching center ring seat. This centering ring seat illustratively may be integrated/fashioned in/with the nozzle casing. Preferably the centering ring is made of a low thermal conductivity substance such as titanium or a ceramic.

BRIEF DESCRIPTION OF THE DRAWINGS

The present invention is elucidated below by means of a preferred embodiment mode and in relation to the appended drawings.

FIG. 1 is a perspective view of one embodiment mode of the present invention,

FIG. 2 is a first side view of the injection molding nozzle of FIG. 1,

FIG. 3 is a second side view of the injection molding nozzle of FIG. 1, however being rotated by 90° from the side view of FIG. 2, FIG. 6a is a sectional view of a further embodiment mode, and FIG. 6b is a detailed view of a nozzle tip of the embodiment mode of FIG. 6a.

DETAILED DESCRIPTION OF THE INVENTION

Figure 4:
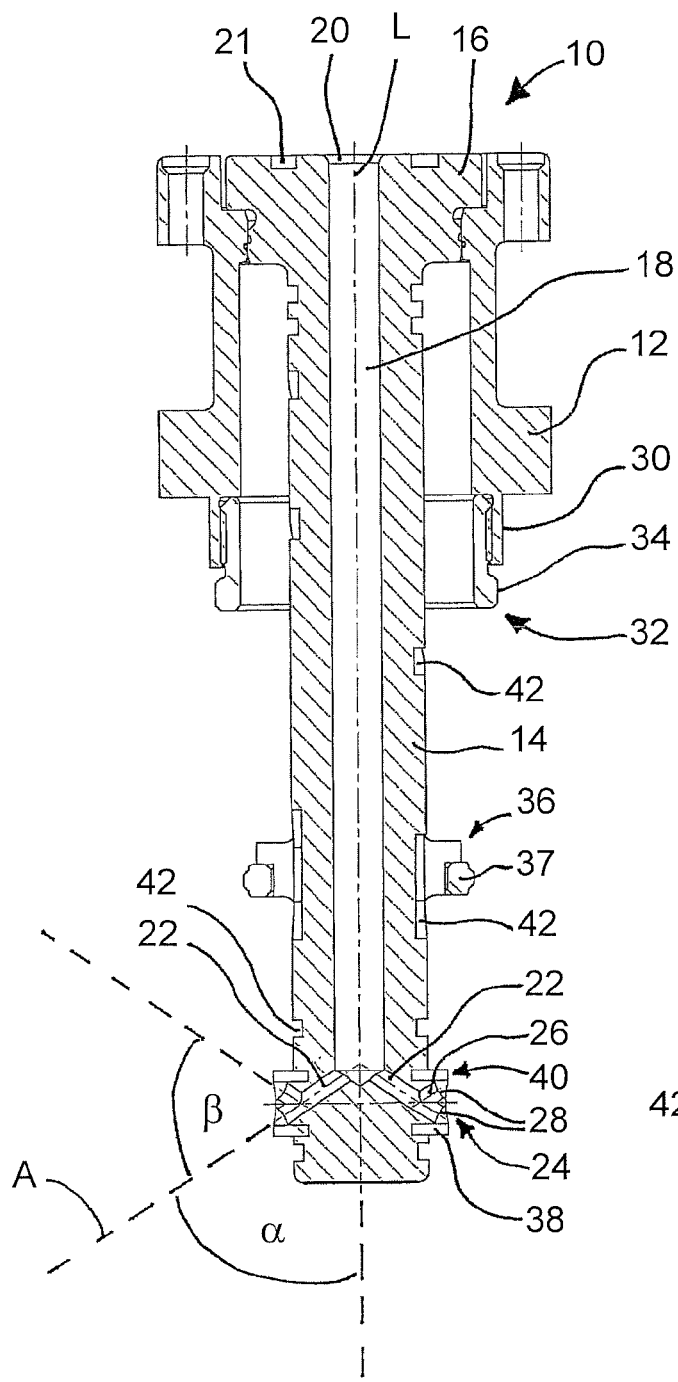
FIG. 4 is a sectional view of the injection molding nozzle of FIG. 1 along the line IV-IV but on an enlarged scale.
Figure 5:
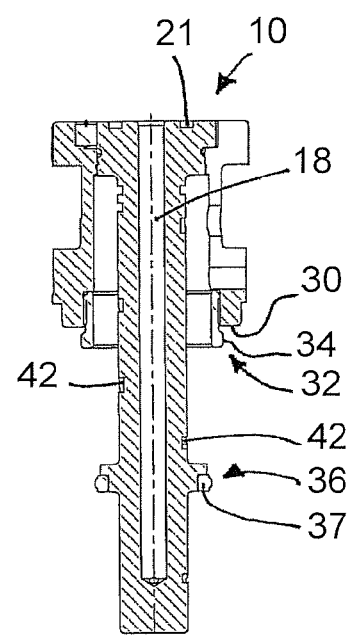
FIG. 5 is a sectional view of the injection molding nozzle of FIG. 1 along the line V-V of FIG. 2.

FIGS. 1 through 5 are different views of a preferred embodiment mode of an injection molding nozzle of the present invention denoted overall by the reference 10.

Said injection molding nozzle 10 is used in injection molding equipment making molded parts from a fluid processing material—for instance a plastic melt. Typically this omitted injection molding equipment comprises a mounting plate and a parallel manifold plate which subtends a system of flow ducts. Said flow ducts issue into several injection molding nozzles 10 illustratively in the form of hot runner nozzles, each nozzle being assembled by a housing 12 to the lower side of the manifold plate. In addition or alternatively, the nozzles 10 also may be mounted directly to the manifold ("TT" design).

Each injection molding nozzle 10 comprises a nozzle casing 14 which subtends a longitudinal axis L and which is fitted at its upper end with a flange-like hookup head 16. In the present instance the hookup head 16 is integral with the nozzle casing 14. Alternatively however the hookup head 16 may be separate and be connected to the nozzle casing 14, for instance by a threaded connection, by a force fit, by soldering/welding, or the like.

A flow duct 18 to pass a melt of processing material is centrally configured in the nozzle casing 14. This flow duct 18 is a borehole and is fitted in its hookup head 16 with a processing material intake feed aperture 20. To seal the injection molding nozzle 10 relative to the omitted manifold plate, an annular groove 21 is fitted concentrically with the processing material feed aperture 20 in the hookup head 16, said groove 21 receiving an omitted sealing ring.

At its lower end the flow duct 18 issues into two connection conduits 22 running downward from the bottom of the flow duct 18 at an angle $\alpha$ to the longitudinal axis L, each connection conduit 22 issuing into a nozzle tip 24. In the present design the angle $\alpha$ is about 60°.

Because in the present instance the angle $\alpha$ is substantially less than 90°, the flow impedance encountered by the melt passing from the flow duct 18 into the two connection conduits 22 can be much reduced over that encountered in the state of the art wherein the angle $\alpha$ is about 90°. Accordingly the flow duct 18 is designed as being a nearly constant flow duct 18, 22, namely no processing material can settle or be standing still as far as the discharge aperture. The nozzle 10 therefore allows constantly optimal results, in particular color changing can be carried out rapidly.

Inside the nozzle tips 24, a further connection conduit 26 branches each time off the corresponding connection conduits 22 at an angle $\beta$ to the axial direction A of said ducts 22, thus subtending two processing material discharge apertures 28 allowing the fluid melt of processing material to enter an omitted mold nest. The nozzle tips 24 preferably are integral with the nozzle casing 14 and also are made of a highly thermally conducting steel. However the nozzle tips 24 also may be separate and made of another substance such as a ceramic.

The injection molding nozzle 10 is inserted in a way into an omitted, substantially cylindrical aperture in the mold insert that said nozzle 10 shall rest by means of a shoulder 30 of the housing 12 on a matching edge of said mold insert. An externally threaded centering sleeve 32 is screwed from below into a matching inside thread of the housing 12 and is fitted with an annular, radially outward pointing centering face 34 that centers the injection molding nozzle 10 relative to the mold insert aperture.

A further centering element 36 is configured between the centering sleeve 32 and the nozzle tips 24 at the nozzle casing 14, said element 36 comprising a centering ring 37 which is made of a substance of low thermal conductivity and which—like the centering face 34 of the centering sleeve 32—centers the injection molding nozzle 10 relative to the wall of the mold insert aperture. This design assures an appropriate alignment of the injection molding nozzle 10 within the mold nest insert in the axial direction A and precludes transverse displacement of the nozzle casing 14.

A sleeve-like sealing element 38 is configured around each nozzle tip 24 to seal these tips 24 relative to the mold insert, the end face 40 of the sealing element 38 constituting its contact surface. The sealing elements 38 are made of thermally poorly conducting substance, in the present instance titanium. This feature reduces the heat transfer from the nozzle tips 24 to the mold insert in order to prevent a drop in temperature in the region of the processing material discharge apertures 28. The end faces 40—acting as the contact surfaces—of the sleeve-like elements 38 are mechanically worked to high accuracy in a way that, together with the nozzle casing 14, they may be introduced into a mold insert at a low temperature and shall rest in sealing manner against the corresponding wall of the mold insert at the latest when at their operational temperature. In this manner (as called for by the design) the centering element 36 reliably prevents the nozzle casing 14 from transversely tilting within the mold insert. Mechanically fine processing is carried out to attain the desired contour and surface roughness of the end faces 40 and may be in the form of grinding and/or chipping.

As clearly indicated in FIG. 3 in particular, the particular nozzle tips 24 do not project beyond the end faces 40 of the sleeve-like sealing elements 38, as a result of which the injection molding nozzle 10 can be inserted in problem-free manner into the integral mold insert. Alternatively the nozzle tips 24 if so desired also may project beyond the end faces 40, in which case the mold insert must be in at least two parts to allow installing the injection molding nozzle.

One or more grooves 42 are fitted into the nozzle casing 14 to receive an omitted filamentary heating conductor. This heating conductor heats both the nozzle casing 14 and the nozzle tips 24 as well as processing material passing through the flow duct 18 and the connection conduits 22 and 26 to a predetermined temperature. Said heating conductor—which acts as a heater—may be pressed into one of the grooves 42 and be soldered/welded or be affixed in some manner therein. Also, an omitted temperature sensor may be jointly pressed into one of the grooves 42, to detect in particular the temperature of the nozzle tips 24. However said temperature sensor also may be configured in a separate groove or borehole configured appropriately in the nozzle casing 14.

Figures 6A, 6B:
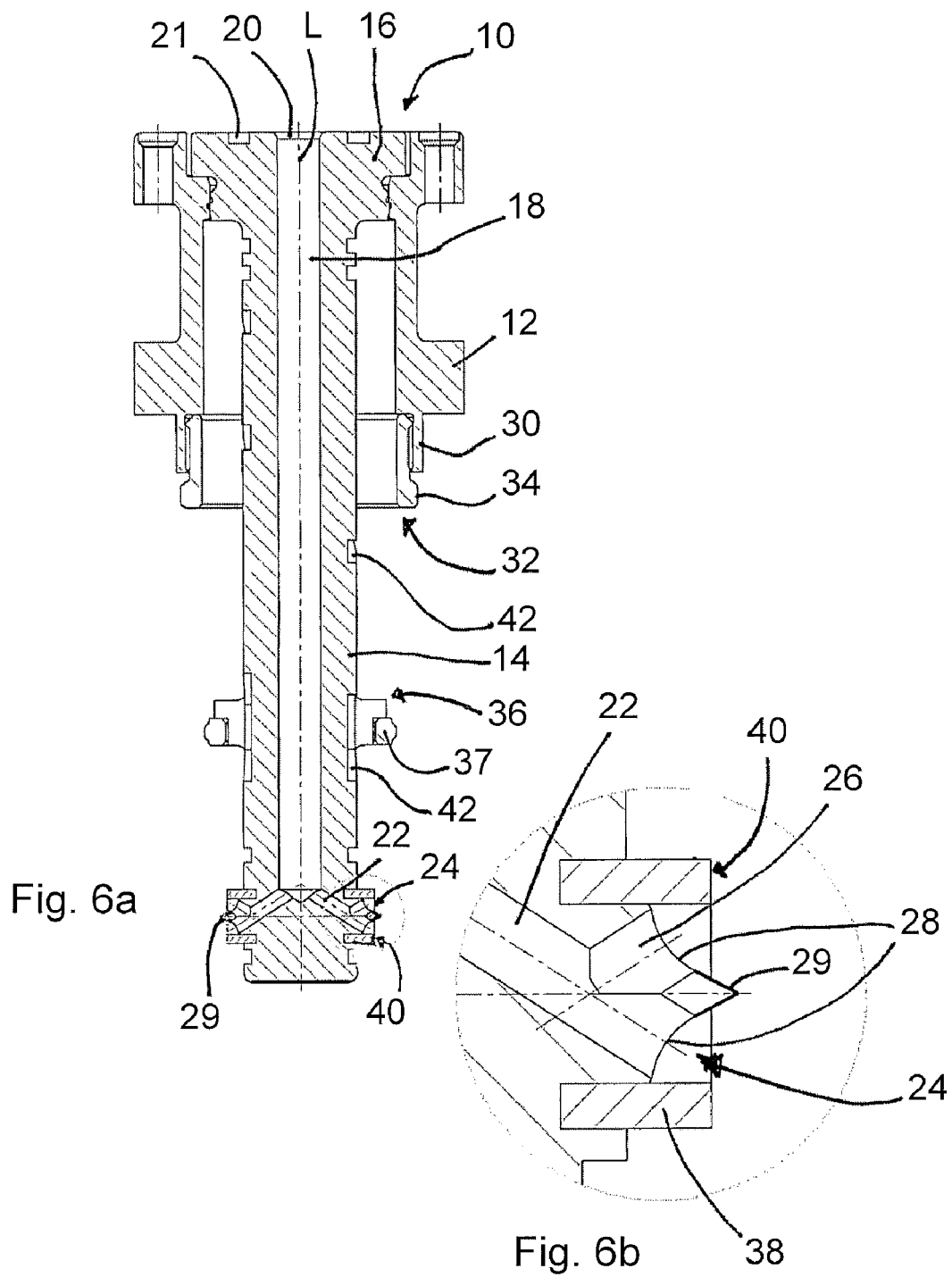

The embodiment mode shown in FIGS. 6a and 6b is an injection molding nozzle like that of FIG. 4. In this instance however the nozzle tip 24 is fitted with a peak 29 projecting beyond the end face 40 of the sleeve-like sealing element 38, this peak preferably extending as far as an omitted, associated gate in the mold nest. Such a design is especially advantageous to preclude forming cold/frozen stoppers/clogging. Accordingly this nozzle is most appropriate to rapidly change colors when injecting especially thin-walled injection molded parts.

It should be borne in mind that the above embodiment mode is for illustrative purposes only and in no way implies limitation. Accordingly changes and modification in and of the injection molding nozzle 10 shown in FIGS. 1 through 5 are admissible without thereby transcending the scope of protection of the present invention, this scope being defined by the appended claims.

In summary, the essential advantages of the present invention are as follows:

The nozzle 10 allows rapid color changes any time and repeatedly

The nozzle casing 14 is fitted with an anti-rotation lock relative to its housing 12 and between said housing and the mold, The nozzle 10 can be installed rapidly and conveniently, i.e., no components need be dismantled prior to its installation and be reassembled following installation, The same advantage applies to dis-assembling the nozzle, no components need be removed, Accordingly the nozzle 10 minimizes maintenance costs, The heater and the temperature sensor are integrated into the nozzle casing 14, whereby temperature transfer and distribution always are optimal.

This text discloses that an injection molding nozzle 10 for an injection molding equipment comprises a nozzle casing 14 subtending at least one flow duct 18 passing a fluid processing material. Also the nozzle 10 is fitted with at least one nozzle tip 24 from which the fluid processing material issues out of nozzle casing 14, the minimum of one nozzle tip 24 running transversely to the longitudinal axis L of the nozzle casing 14 and preferably being integral with it. The flow duct 18 continues within the nozzle tips 24 in almost impedance-free manner. This feature is attained by providing connection conduits 22 issuing within the sealing elements 38 and therefore ahead of the corresponding mold nest gate.

| List of References | |
|---|---|
| A | axial direction |
| α | angle |
| β | angle |
| L | longitudinal axis |
| 10 | injection molding nozzle |
| 12 | housing |
| 14 | nozzle casing |
| 16 | hookup head |
| 18 | flow duct |
| 20 | processing material feed aperture |
| 21 | annular groove |
| 22 | connection conduits |
| 24 | nozzle tip |
| 26 | connection conduits |
| 28 | processing material discharge apertures |
| 29 | peak |
| 30 | collar |
| 32 | centering sleeves |
| 34 | centering faces |
| 36 | centering element |
| 37 | centering ring |
| 38 | sleeve-like centering element |
| 40 | end face |
| 42 | grooves. |

The invention claimed is:

1. An injection molding nozzle (10) for injection molding equipment, comprising a nozzle casing (14) having a longitudinal axis (L) and subtending at least one flow duct (18) which passes a fluid processing material, said nozzle further comprising at least one nozzle tip (24) by which said fluid processing material is discharged from said nozzle, said at least one nozzle tip (24) running transversely to said casing's longitudinal axis (L), wherein said nozzle casing directly forms said at least one nozzle tip.

2. Injection molding nozzle as claimed in claim 1, characterized in that a sealing element (38) is configured around each nozzle tip (24) and comprises a contact surface (40) which, in its design state, rests in sealing manner against a mold insert wall.

3. Injection molding nozzle as claimed in claim 2, characterized in that the sealing element (38) is made of a substance of low thermal conductivity.

4. Injection molding nozzle as claimed in claim 2, characterized in that the contact surface (40) of the sealing element (38) comprises a contact surface which is fashioned in mechanically fine manner.

5. Injection molding nozzle as claimed in claim 2, characterized in that the contact surfaces (40) of all sealing elements (38) are configured on a cylindrical surface.

6. Injection molding nozzle as claimed in claim 2, characterized in that the sealing element (38) is designed in a way that, together with the nozzle casing (14), it can be inserted at low temperature into a mold insert and, upon reaching a predeterminable operational temperature, it shall rest in sealing manner against an associated wall of the mold insert.

7. Injection molding nozzle as claimed in claim 2, characterized in that the contacting surface (40) of the sealing element (38) is an end face of said element.

8. Injection molding nozzle as claimed in claim 2, characterized in that the nozzle tip (24) is designed in a manner that it shall not project outwardly beyond the contact surface (40) of the sealing element (38).

9. Injection molding nozzle as claimed in claim 2, characterized in that the nozzle tip (24) is fitted with a peak (29) projecting beyond the contact surface (40) of the sealing element (38).

10. Injection molding nozzle as claimed in claim 1, characterized in that each nozzle tip (24) is fitted a flow duct (22).

11. Injection molding nozzle as claimed in claim 10, characterized in that the flow duct (18) in the nozzle casing (14) is extended by the flow ducts (22).

12. Injection molding nozzle as claimed in claim 1, characterized in that a heater and/or a temperature sensor are integrated into the nozzle casing (14).

13. Injection molding nozzle as claimed in claim 1, characterized in that a centering element (36) is configured at the periphery of the nozzle casing (14) and centers this nozzle casing (14) within a mold insert.

14. Injection molding nozzle (10) as claimed in claim 13, characterized in that the centering element (36) at least in part is made of a thermally poorly conducting substance.

15. Injection molding nozzle as claimed in claim 13, characterized in that the centering element (36) includes a centering ring (37).

16. Injection molding nozzle as claimed in claim 15, characterized in that the centering ring (37) is made of a thermally poorly conducting substance.

17. Injection molding nozzle as claimed in claim 2, wherein the sealing element is separable from the nozzle tip.

* * * * *